Aug. 1, 1933.   E. B. KNOWLES ET AL   1,920,404
NUT SHREDDING MACHINE
Filed July 13, 1931
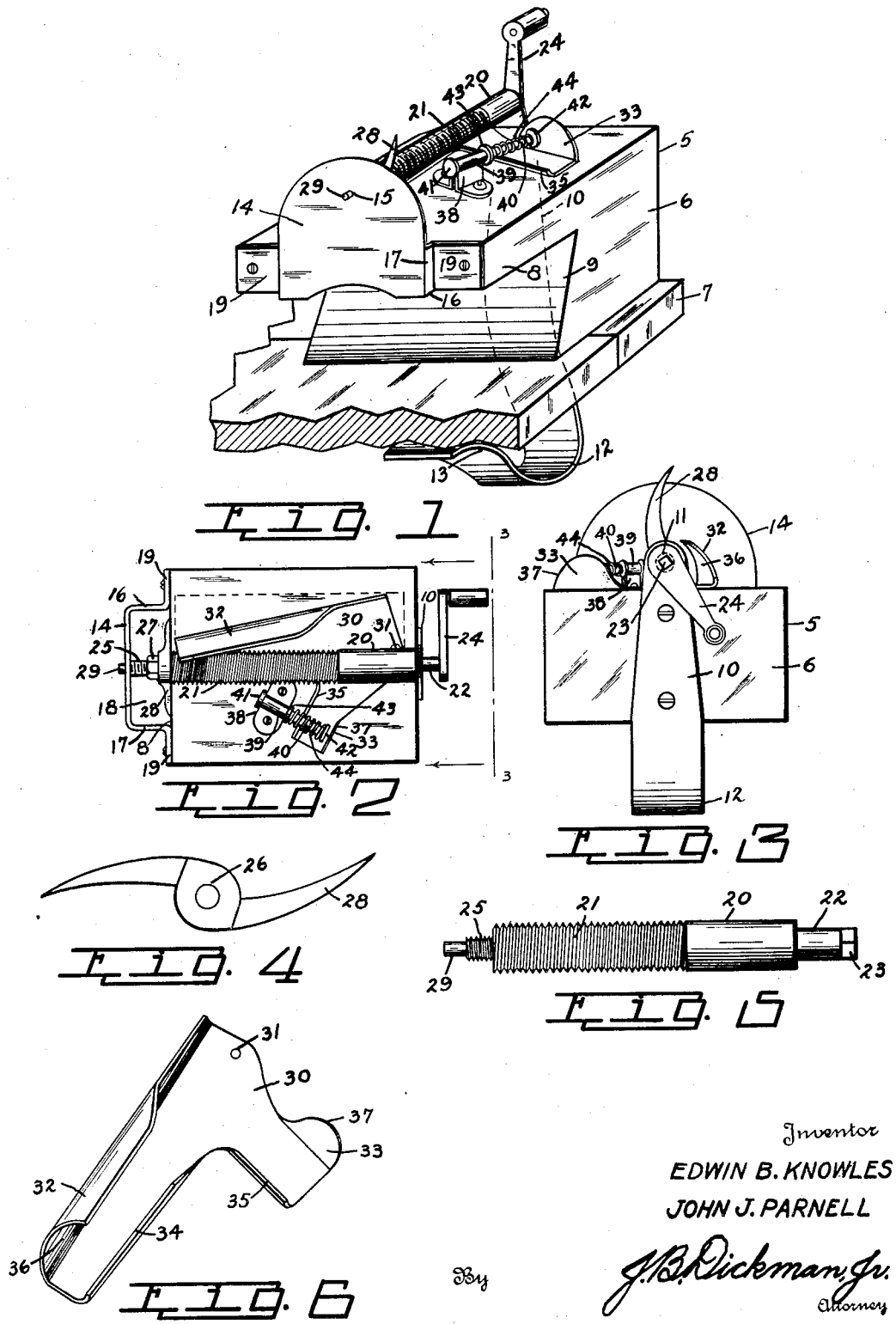
Inventor
EDWIN B. KNOWLES
JOHN J. PARNELL
By J. B. Dickman, Jr.
Attorney Patented Aug. 1, 1933

1,920,404

UNITED STATES PATENT OFFICE 1,920,404

NUT SHREDDING MACHINE

Edwin B. Knowles and John J. Parnell, Albany, Ga.; said Parnell assignor to B. R. W. Knowles, Albany, Ga.

Application July 13, 1931. Serial No. 550,315

2 Claims. (Cl. 146—113)

Our invention relates to improvements in nut shredding machines.

An object of our invention is the provision of feeding mechanism, wherein the meat of nuts is automatically fed forward to the slicing knives.

Another object is the provision of an opening at one end of the base for the insertion of a plate or the like under the knives, the shreds falling into said plate.

Another object of our invention is the provision of a bell crank plate so formed that the nut to be sliced will be held in snug engagement with the feeding mechanism.

Another object of our invention is the provision of a spring tensioning means for keepng the bell crank plate under tension during the feeding and shredding operation.

The principal object of our invention is the provision of a device, the mechanism of which is so arranged that the meat of nuts may be sliced in thin wafers, thereby rendering the meat easy to masticate and rendering the meat of the nut suitable for use in pastry, candies and the like.

A further object of our invention is the provision of a shredding device, simple in construction, and one that may be manufactured at a minimum cost.

With these and other objects in view, our invention consists in the novel construction, arrangement and formation of parts as will be hereinafter more specifically described, claimed and illustrated in the accompanying drawing, in which:

Figure 1 is a perspective view of our nut shredding device mounted upon a table top, the table top being shown fragmentarily and in section.

Figure 2 is a top plan view of our nut shredding machine, the dotted line indicating the position the bell crank plate member assumes when a nut kernel is placed in the pocket between the longitudinal threaded shaft and the sleeve plate.

Figure 3 is an end elevational view on line 3—3 of Figure 2 looking in the direction of the arrows.

Figure 4 is a detail view of the knife.

Figure 5 is a detail view of the screw feeding shaft.

Figure 6 is a perspective view of the bell crank plate, showing the rolled edge forming the pocket or trough on one side and the tongue abutment which the plunger engages on the angular side.

Referring to the drawing in detail, wherein similar reference characters designate corresponding parts throughout the several views, the numeral 5 represents the nut shredding machine having a base member 6 of any suitable material and as illustrated in Figure 1, the base is superimposed upon a flat surface 7, such as a table top or the like.

A section of the base 6 at one end is cut away, providing a ledge 8 and an inclined wall 9, the opening permitting dishes or the like to be inserted therein for a purpose to be later described.

Mounted on one end of the base in any suitable manner is a bracket 10 which serves a two fold purpose, as a bearing and a clamp. A portion of the bracket 10 extends an appreciable distance above the top of the base and is provided with an aperture 11 which serves as a bearing. The upper portion of the bracket 10 is of a reduced width having a rounded head. The lower portion of the bracket extends downwardly an appreciable distance below the bottom face of the base and is curved at 12 forming a clamping tongue 13 for holding the base 6 in a rigid position to the table top or any other suitable flat surface.

On the end of the ledge 8 is mounted a shield plate bracket 14, the greater portion of which extends above the top face of the base, acting as a shield for the knives, the top edge of the shield plate being arcuate. An aperture 15 which serves as a bearing is provided in the bracket adjacent the crown, the lower portion of the bracket being provided with a pair of ears 16, each of which is bent at right angles to the body of the bracket forming an offset 17, providing a space 18 between the inner face of the bracket 14 and the end face of the ledge 8 for the rotation of the knives to be later described. The ears are further bent at right angles to the off-set 17 providing tongues 19 for securing the shield plate bracket 14 securely to the end face of the ledge 8 in any suitable manner.

Rotatably mounted between the brackets 10 and 14 is a longitudinal shaft 20, having a screw threaded portion 21. The shaft has a reduced shank end 22 which engages the bearing 11, the shank extending through the bearing and having its end 23 squared for the reception of a handle 24. The opposite end of the shaft has a reduced end 25 which is screw threaded and which engages the female threads of a hub 26 for locking engagement of the hub on the shaft, the hub being further rigidly secured on the shaft by a lock nut 27. The hub 26 has integrally formed therewith a pair of curvilinear knives 28, the cutting edges of the knives being arranged in the same plane to each other. The shaft 20 has the reduced end 25 further reduced forming a bearing shank 29, which engages the bearing 15 in the shield plate and extends through the bearing.

A bell crank plate 30, is pivotally mounted on the top face of the base as shown at 31, providing means for movement toward and away from the shaft 20. The bell crank plate 30 is provided with ears 32 and 33, the opposite edges being slightly flanged at 34 and 35 forming a channel way in the bell crank plate, the channel way serving as a catch tray for small particles of nuts from the screw threads and the knives. The ear 32 is curved forming a pocket or trough 36 into which the nut is inserted for transmission to the knives as well as impinging the nut against the screw threads 21 of the longitudinal shaft. The ear 33 of the bell crank plate is bent at right angles to the base forming an abutment 37 for a purpose to be described.

Mounted on the top face of the base adjacent, and disposed at an angle to the longitudinal feed screw is a bracket 38 provided with feet for securing the bracket to the base. The head 39 of the bracket is tubular and has mounted therein a plunger 40 which is provided with enlarged heads 41 and 42, the end 41 preventing the plunger from becoming disengaged from the tubular head. Mounted upon the plunger and interposed between the tubular head 39 and the enlarged head 42 of the plunger is a floating washer 43 and a coil spring 44, the washer serving as a seat for the coil spring when the spring is compressed.

The foregoing description taken in conjunction with the drawing, the operation of our device is as follows.

A nut is placed in the pocket or trough 36 of the bell crank plate 30, the bell crank plate assuming the position shown by the dotted line in Figure 2 of the drawing, the tongue 33 on the bell crank plate impinging against the head of the plunger 42 causing a tension on the coil spring 44. The coil spring 44 keeps the nut in the pocket or trough frictionally impinged against the screw threads 21 of the longitudinal shaft 20. The handle at one end of the shaft is turned clockwise, the longitudinal shaft is rotated, the nut being feed to the curvilinear knives which shreds the nut, the shreds falling in a dish or pan under the knives, the dish or the like being permitted to extend into the base due to the opening formed in the base. It is to be noted that the pocket or trough is of sufficient size to accommodate a plurality of nuts.

Changes in detail may be made without departing from the spirit or the scope of our invention, but what we claim as new is:

1. In a nut shredding device, a base, an opening in said base, a ledge integral with said base and extending over said opening, a shield plate at one end of the base, a bracket at the opposite end of the base, a resilient clamping arm for the base formed on said bracket, a feed screw having its opposite ends rotatably mounted in the shield plate and bracket, means for rotating the screw, means for frictionally holding a nut against the screw, and a cutter secured to the screw adjacent to the shield plate.

2. In a nut shredding device, a base, an opening in said base, a ledge integral with said base and extending over said opening, a feed screw rotatable on the base, a rotatable cutter at one end of the feed screw, and means for holding a nut against the feed screw including a bell crank shaped plate, a nut holding trough on one end of the plate, and a spring pressed plunger engaging the opposite end of the plate urging the trough toward the screw.

EDWIN B. KNOWLES.
JOHN J. PARNELL.